US007185089B2

(12) United States Patent
Satomi et al.

(10) Patent No.: US 7,185,089 B2
(45) Date of Patent: Feb. 27, 2007

(54) METHOD AND SYSTEM FOR DISPLAYING INTEGRATED LOG INFORMATION

(75) Inventors: Mitsunori Satomi, Kawasaki (JP); Atsushi Hatakeyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 672 days.

(21) Appl. No.: 10/438,647

(22) Filed: May 14, 2003

(65) Prior Publication Data
US 2004/0148389 A1    Jul. 29, 2004

(30) Foreign Application Priority Data
Jan. 24, 2003   (JP)   ............................. 2003-015523

(51) Int. Cl.
   *G06F 15/16*   (2006.01)
(52) U.S. Cl. ..................................... 709/224
(58) Field of Classification Search ................ 709/224, 709/223, 203, 227
See application file for complete search history.

(56) References Cited

U.S. PATENT DOCUMENTS 5,101,402 A * 3/1992 Chiu et al. .................. 709/224
6,490,624 B1 * 12/2002 Sampson et al. ........... 709/227
6,738,822 B2 * 5/2004 Fukasawa et al. .......... 709/231
6,856,601 B1 * 2/2005 Bell et al. .................... 370/252
6,862,689 B2 * 3/2005 Bergsten et al. ............... 714/4
6,950,845 B2 * 9/2005 Givoly ........................ 709/200
6,985,941 B2 * 1/2006 Schweitzer et al. ......... 709/224
7,003,575 B2 * 2/2006 Ikonen ........................ 709/228

FOREIGN PATENT DOCUMENTS

JP          2001-356939          12/2001

* cited by examiner

*Primary Examiner*—David Y. Eng
(74) *Attorney, Agent, or Firm*—Townsend and Townsend and Crew LLP

(57) ABSTRACT

A method for collecting log information relating to specific processing from pieces of log information for integration is disclosed. Session information, which is given every time log information is processed and included in the log information held by a server, is recorded in a session-information management table. In addition, how session information associates with others among different pieces of log information is recorded in a session-information association table. Recursively searching the session-information association table by use of session information specified by a user through a target log entry input unit enables identification of a set of session information relating to the processing to which the user pays attention. Information corresponding to each of the session information related is collected from log information, and is integrated according to the recorded data and time of a log.

20 Claims, 13 Drawing Sheets

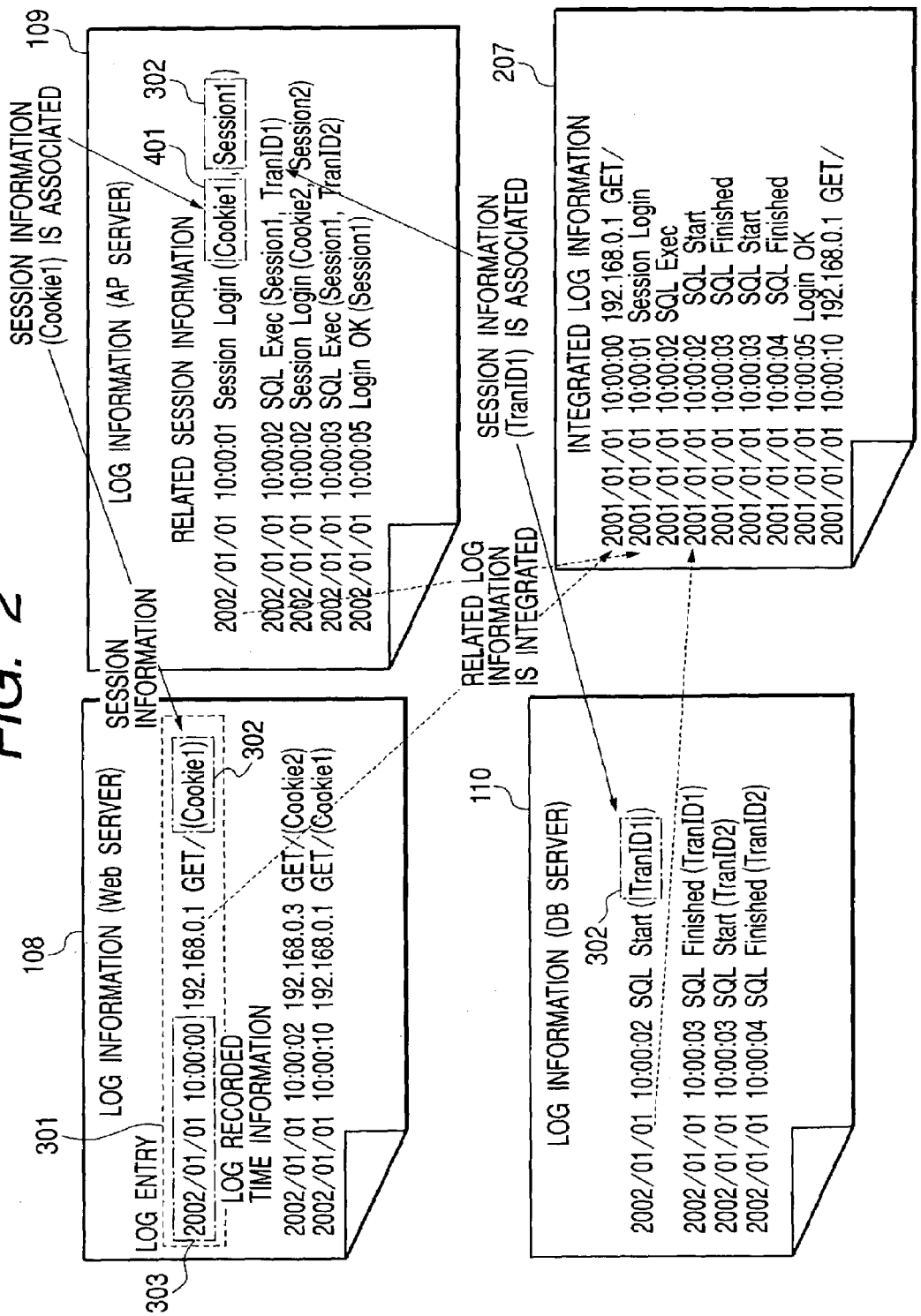

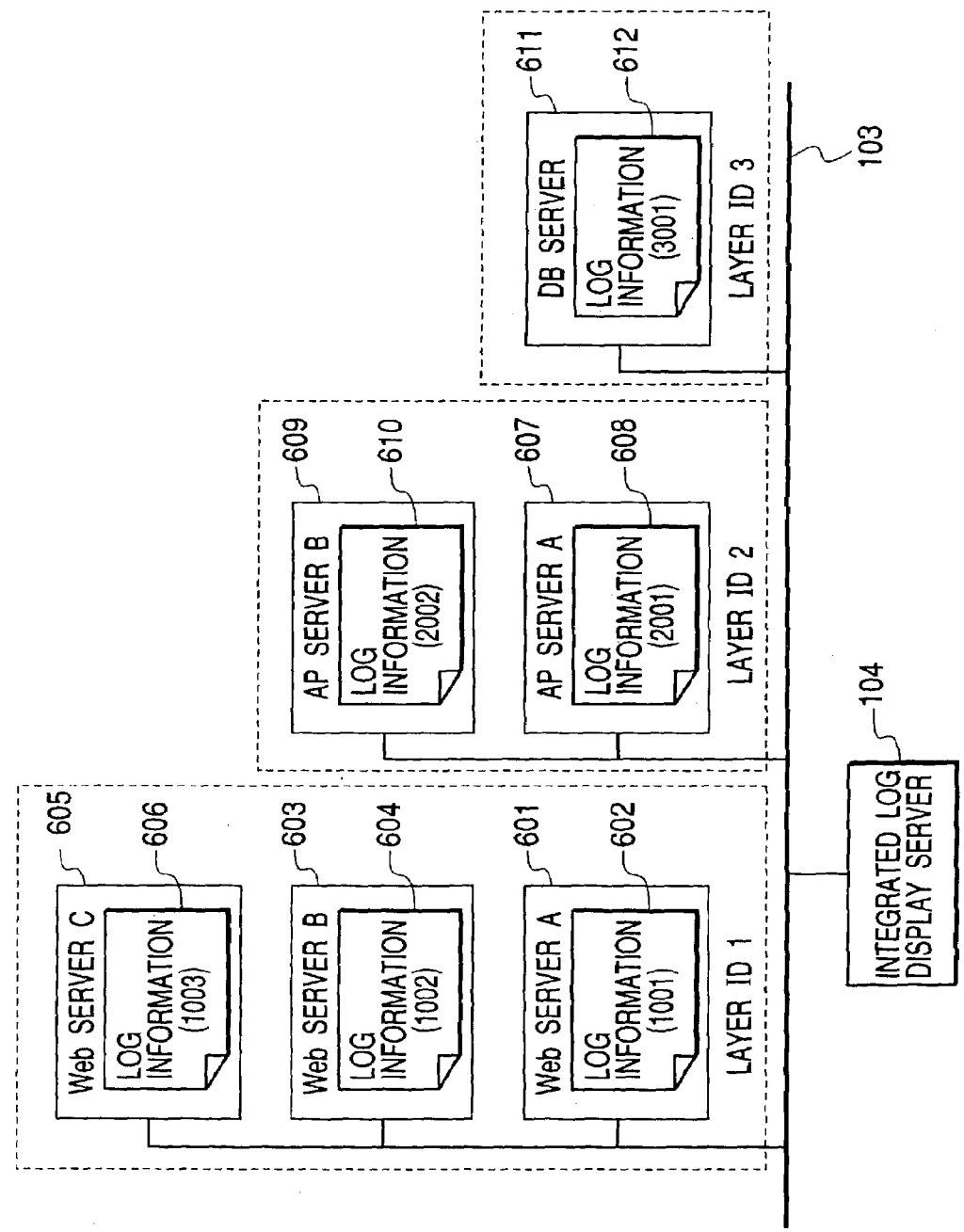

| LAYER ID | LOG INFORMATION ID | SERVER NAME | LOG FILE NAME | LOG FORMAT | RELATED SESSION FLAG |
|---|---|---|---|---|---|
| 1 | 1001 | Web SERVER A | Access.log | Web | 0 |
| 1 | 1002 | Web SERVER B | Access.log | Web | 0 |
| 1 | 1003 | Web SERVER C | Access.log | Web | 0 |
| 2 | 2001 | AP SERVER A | AP.log | AP | 1 |
| 2 | 2002 | AP SERVER B | AP.log | AP | 1 |
| 3 | 3001 | DB SERVER C | DB.log | DB | 0 |

LOG-CONFIGURATION DEFINITION TABLE

| LOG INFORMATION ID | SESSION INFORMATION |
|---|---|
| 1001 | Cookie1 |
| 1001 | Cookie2 |
| 2001 | Session1 |
| 2001 | Session2 |
| 3001 | TranID1 |
| 3001 | TranID2 |

SESSION-INFORMATION MANAGEMENT TABLE

FIG. 7

SESSION-INFORMATION ASSOCIATION TABLE — 206

| LOG INFORMATION ID | SESSION INFORMATION | RELATED SESSION INFORMATION |
|---|---|---|
| 2001 | Session1 | Cookie1 |
| 2001 | Session1 | TranID1 |
| 2001 | Session2 | Cookie2 |
| 2001 | Session1 | TranID2 |

FIG. 11

| LOG DECODED TIME INFORMATION | LOG INFORMATION ID | LAYER ID | SESSION INFORMATION |
|---|---|---|---|
| 2002/01/01 10:00:00 | 1001 | 1 | Cookie1 |
| 2002/01/01 10:00:01 | 2001 | 2 | Session1 |
| 2002/01/01 10:00:02 | 2001 | 2 | Session1 |
| 2002/01/01 10:00:05 | 1001 | 1 | Cookie2 |
| 2002/01/01 10:00:06 | 2001 | 2 | Session2 |
| 2002/01/01 10:00:07 | 2001 | 2 | Session1 |
| 2002/01/01 10:00:08 | 2001 | 2 | Session1 |

1501
1502
1503

SESSION-INFORMATION RECORDED DATE AND TIME TABLE

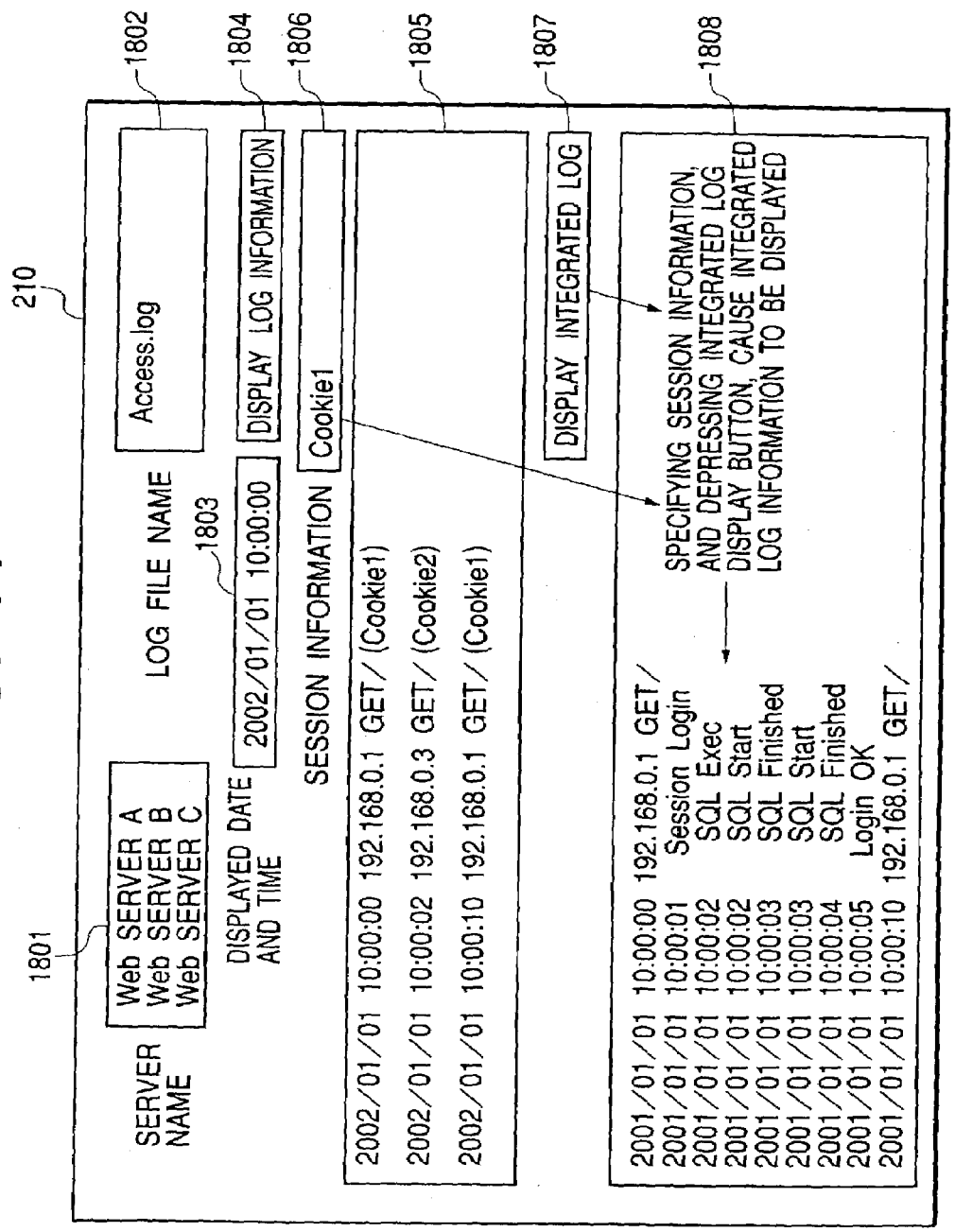

METHOD AND SYSTEM FOR DISPLAYING INTEGRATED LOG INFORMATION

CROSS-REFERENCES TO RELATED APPLICATIONS

The present disclosure is related to commonly-assigned co-pending U.S. patent application Ser. No. 10/438,696, filed May 14, 2003, entitled "Method and System for Displaying Integrated Log Information."

BACKGROUND OF THE INVENTION

The present invention relates to a system, composed of a plurality of computers connected via a network, for integrating pieces of log information, each piece of which is independently held by each of the plurality of computers.

At present, a system that provides a user with services such as on-line shopping on the Internet is coming into widespread use. Using a mechanism of WWW (World Wide Web) of the system, the user can receive the services by accessing a Web server which is a computer providing the services through a general-purpose browser used for the WWW.

At an early stage, contents of the services mainly include basic and simple services of information providing type such as information retrieval services. Today, more complicated services are being provided, including online shopping services for selling and purchasing commodities and services accompanied by actual movement of money, and online banking services that enable a user to do business with a bank.

The system on the server side providing the services conventionally has only the Web server. However, for the purpose of providing users with such complicated services, not only the Web server but also several kinds of servers are placed in the system on a function basis. One system as a general example is constituted of three kinds of servers as follows: a Web server for generating information to be given to a user; an application server for controlling actual flows of operations; and a database server for storing operations data such as stock information and account information.

In addition, since the Internet basis services provided to users are designed to be freely utilized at any time a user wants to, accesses from many users are sometimes concentrated. Therefore, it is necessary to make a design that provides a system on the server side with sufficient performance. Such a case generally takes a configuration in which a plurality of servers of similar kind are connected to achieve an increase in performance, instead of using one server.

As described above, a today's Web system includes two or more kinds of servers having different functions, wherein there are a plurality of servers belonging to each kind. If such a system configuration is used, a set of history information about processing of a certain user is dispersively stored in a plurality of pieces of log information, each piece of which is independently output as a file by each server.

Such systems for managing system operation include, as a function of supporting an administrator, a function whereby log information which the administrator wants to obtain is obtained through simple operation using an integration management consol that displays system configurations on the server side in a list format, and thereby the log information is presented.

In the prior art, Japanese Patent Laid-open No. 2001-356939 proposes a method for facilitating the analysis of log information. In the method, various kinds of log information are converted into an intermediate format, are subsequently sorted and merged in order of time, and then statistical information such as the frequency of appearance of a keyword in the log information is provided to the administrator at a time.

The conventional methods described above have the following problems. To be more specific, one piece of log information which can usually be viewed by the administrator at a time includes only a part of history information on a processing flow which the administrator really wants to view. In other words, in order to enable the administrator to keep track of the total processing, the following work is required: obtaining all log information which is output by all related servers; collecting information considered to be related to from among the all log information; and estimating a process flow. However, in the complicated system such as the today's Web system, the work is considered to be practically impossible.

Moreover, if the method that uses the frequency of appearance of a keyword described in the prior art is applied, the log information integrated in order of time is mixed with log information that has been accidentally recorded at the same time, with the result that the mixed log information is presented to the administrator. Accordingly, it is not possible to obtain only processing history information that the administrator really needs. For example, if a plurality of users utilize a Web server simultaneously, log information as a result of an access by each user is successively recorded in a log file simply in order of time. Therefore, the log information made by the two users cannot be separated by use of the order of time. To be more specific, although referring to all log information is required to enable the administrator to keep track of system operation, it is not possible to track a process flow by a simple merge and a sort in order of time.

SUMMARY OF THE INVENTION

It is therefore an object of the present invention is to provide a system for collecting pieces of information needed for an administrator from pieces of log information retained by two or more kinds of and a plurality of servers that constitute a complicated system such as a Web system.

An Integrated log displaying method according to the present invention is based on the assumption that the method is utilized in a system comprising a plurality of servers connected to each other via a network. Each server constituting the system holds log information as a history of processing in its own server. When a plurality of processing is executed, information used to identify each processing (hereinafter referred to as session information) is recorded in this log information. In addition, in log information of a server existing as a middle layer of the processing, the association of session information, which is effective in own server, with session information, which is effective in another server where the next processing is performed, is recorded.

According to the present invention, session information included in log information held by each server is recorded in a session-information management table. Further, the association between those session information is collected from the log information, and recorded in the session-information association table.

In the Integrated log file method according to the present invention, a part of log information relating to processing to which a user pays attention is specified from among the log information. Searching the session-information association table for session information corresponding to the specified part enables retrieval of other session information (hereinafter referred to as related session information) relating to the session information. Regarding each of the retrieved related session information as an appropriate session information, the session-information association table is searched again, and as a result, related session information is obtained. Doing this search recursively enables identification of a set of session information relating to the processing to which the user pays attention.

Next, log information corresponding to the session information is collected for each of session information related, and then those collected log information is integrated according to the recorded date and time of the log. The Integrated log information is log information relating to the processing to which the user paid attention, and is therefore arranged in a form that assists the user in easily understanding a process flow before the information is presented to the user.

BRIEF DESCRIPTION OF THE DRAWINGS

FIG. 2 is a diagram illustrating record formats of log information, and integrated log information, as an example;

FIG. 3 is a block diagram illustrating the relationship among a Web server, an AP server, a DB server, and an integrated log display server in a first embodiment;

FIG. 4 is a diagram illustrating a configuration of a log-configuration definition table;

FIG. 5 is a diagram illustrating a configuration of a session-information management table;

FIG. 7 is a diagram illustrating a configuration of a session-information association table;

FIG. 11 is a diagram illustrating a configuration of a session-information association table;

FIG. 14 is a diagram illustrating an example of an input screen of a target log entry input unit.

DESCRIPTION OF THE PREFERRED EMBODIMENT:

First Embodiment

Figure 1:
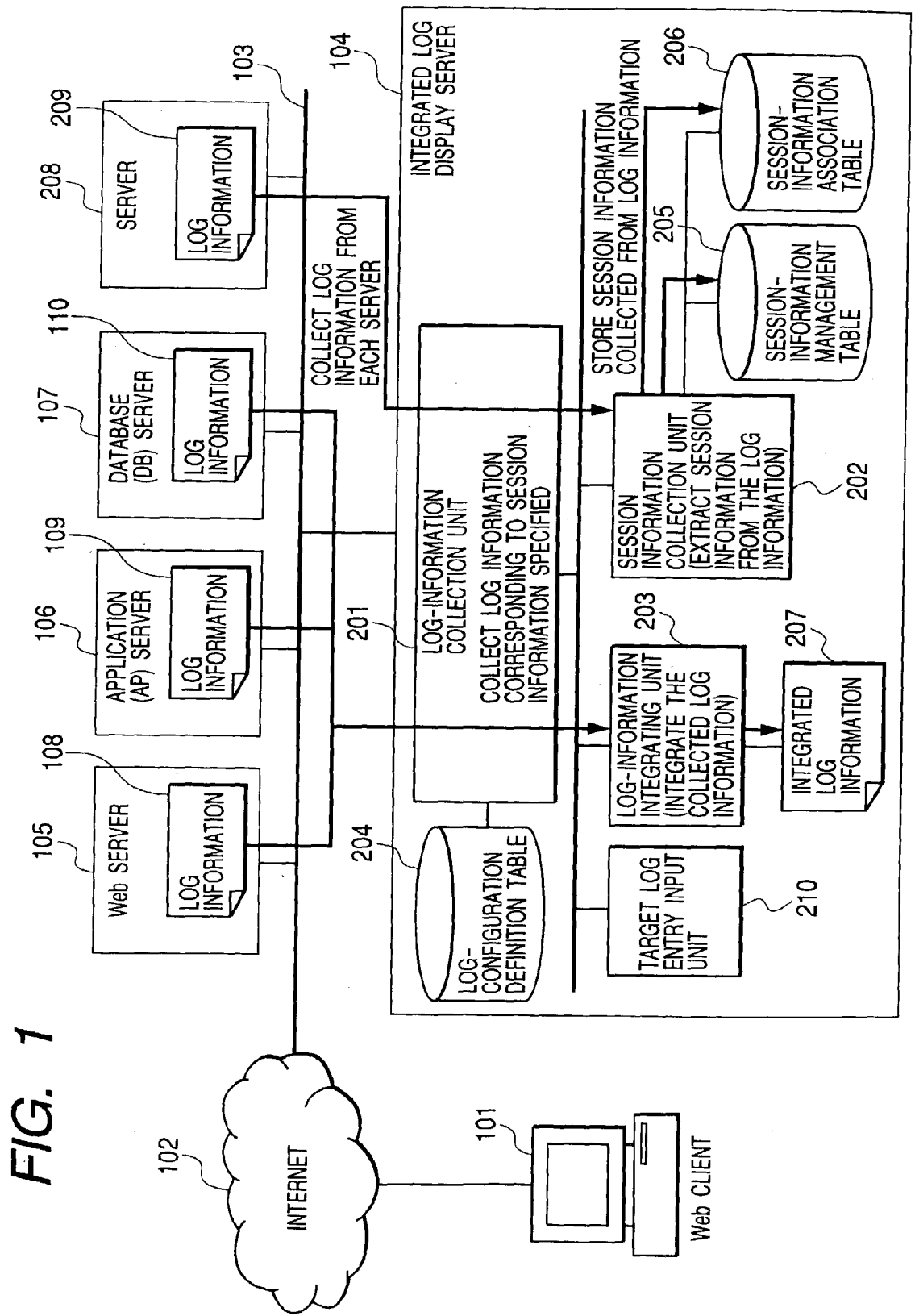
FIG. 1 is a diagram illustrating a total configuration including a Web client, a Web server, and an integrated log display server according to an embodiment of the present invention.

A first embodiment of the present invention will be described in detail with reference to drawings below. FIG. 1 is a diagram illustrating a total configuration of one embodiment according to the present invention. In this embodiment, a system that provides a user who utilizes a Web client 101 with services such as on-line shopping via the Internet 102 will be described. The system on the server side, which provides services, has a configuration in which a plurality of servers, each of which is in general a computer having a function different from the other, are connected to a network 103.

In the embodiment shown in FIG. 1, the system provides services by use of three kinds of servers as follows: a Web server 105 having a function of generating data that is displayed on a screen of the Web client 101; an application server 106 having a function of controlling operation of the provided services (hereinafter referred to as "AP server"); and a database server 107 having a function of holding data required for the services (hereinafter referred to as "DB server").

In a series of execution steps realized by the functions of these servers, the Web server 105 receives an execution request from the Web client 101, and then transmits contents of the execution request to the AP server 106. The AP server 106 extracts data required for the execution from the DB server 107, and executes the services. After that, if it is necessary to change data in the DB server 107, the AP server 106 updates the data, and then transmits the result of the execution to the Web server 105. The Web server 105 converts the result of the execution into a HTML (Hyper Text Markup Language) format that can be interpreted by the Web client 101, and then sends it back to the Web client 101. This structure on the server side is designated as "three-layer structure". The shares of the execution and the flow of the execution are determined among these three kinds of servers. In this case, each server is compared to one layer.

The servers respectively hold log information 108, 109, 110, each of which independently has history information on operation in its own server. The log information held in each server is usually saved in a text file format. It is so devised that contents of the log information can be referred to from an integrated log display server 104 via the network 103. In this embodiment, three kinds of servers, that is to say, the Web server 105, the AP server 106, and the DB server 107, constitute the system. However, this embodiment can also be applied to a system that includes only part of these servers, and a system that includes a server having log information and other functions.

FIG. 1 illustrates a detailed configuration of the integrated log display server 104, and the relationship between the Integrated log display server 104 and a server 208 that holds log information 209. The server 208 in FIG. 1 is a common expression of a server having log information 209. Each of the Web server 105, the AP server 106, and the DB server 107 is a kind of the server 208.

A general format of the log information 209 is shown in the upper left of FIG. 2 by taking the log information 108 of the Web server 105 as an example. Since the log information 209 is recorded as a history of the processing performed in the server 208, a log entry 301, which is a unit of recording, is added to the log information 209 in order of time recorded.

In addition, in the log entry 301, log recorded time information 303 indicating the date and time at which the log entry 301 is recorded, and session information 302 indicating which unit of processing in the log information 209 the log entry 301 relates to, are output. For example, in the Web server 105, a cookie, which is an identifier used to identify each Web client 101 that has accessed the Web server 105, is equivalent to the session information 302.

A log format of the log information 109 in the AP server 106 is shown as another format of log information in the upper right of FIG. 2. Although this log format is basically the same as that of the Web server 105, specific session information 302 that is different from the session information 302 of the Web server 105 is given to the session information 302 in the log information 109.

In addition, because the AP server 106 is located in the middle layer of the three-layer structure, not only the session information 302 in own log information 109 but also session information 302 in the Web server 105 and the DB server 107, which are other layers, is recorded in the log information 109 as related session information 401. "Cookie 1" and "TranID 1" in the log information 109 are equivalent to the related session information 401. It is possible to judge the association of the session information 302 in different layers, for example, the Web server 105 and the AP server 106 by associating this related session information 401 with the session information 302.

A log format of the log information 110 in the DB server 107 is shown as another format of log information in the lower left of FIG. 2. Although this log format is basically the same as that of the Web server 105, the session information 302 in the log information 110 is given in units of processing that is called transaction in the DB server 107.

Next, a configuration in the integrated log display server 104 shown in FIG. 1 will be described. All information about log information 209 that is managed in the integrated log display server 104 is defined in a log configuration definition table 204.

A log information collection unit 201 selectively collects log information that matches a condition specified by the log information 209 in the server 208. A session-information extraction unit 202 extracts session information 302 and session related information 402 from the log information collected by the log information collection unit 201 to create a session-information management table 205 and a session-information association table 206. A log information integrating unit 203 integrates the log information collected by the log information collection unit 201 into a form that assists a user in easily understanding the log information, and thereby generates Integrated log information 207. A target log entry input unit 210 is used by a user of the present invention to specify a target that the user wants to obtain as integrated log information 207.

At present, in order to give scalability to the redundancy of the system and the performance of the total system, each layer of a general Web system includes a plurality of servers that function in a similar manner. FIG. 3 is a diagram illustrating a configuration of a system comprising three Web servers (Web server A601, Web server B603, Web server C605), two AP servers (AP server A607, AP server B609), and one DB server 611.

Figure 13:
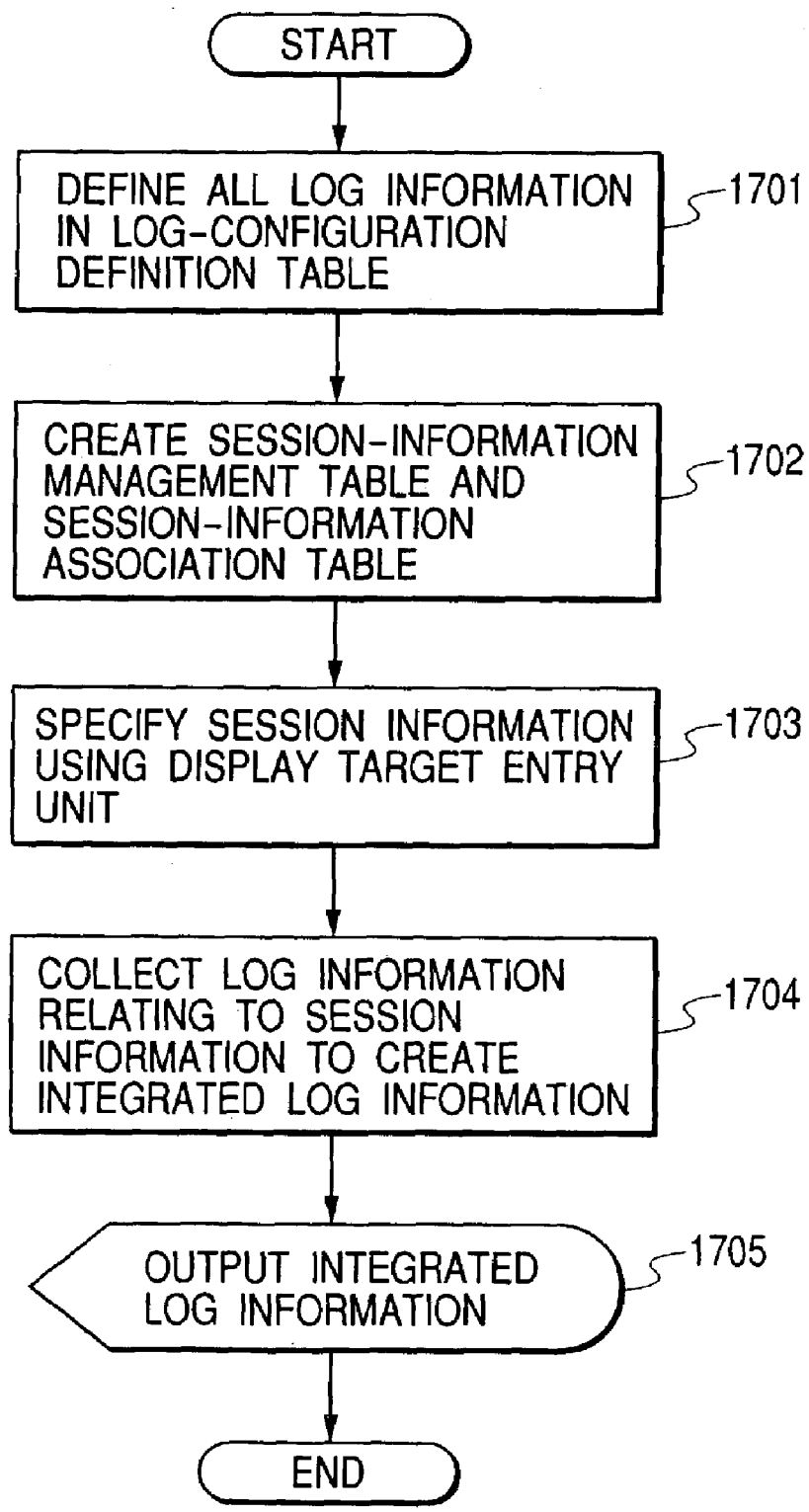
FIG. 13 is a flowchart illustrating a total process flow according to the first embodiment.

A total process flow of this embodiment will be described with reference to a flowchart shown in FIG. 13. To begin with, definition information about all log information 209 included in this system configuration is defined in the log-configuration definition table 204 (step 1701). FIG. 4 illustrates details of the log-configuration definition table 204. In the log-configuration definition table 204, a row corresponds to a piece of log information 209. A layer ID represents a layer in which a server is located. A layer ID 1 denotes a layer in which the Web server is located; a layer ID 2 denotes a layer in which the AP server is located; and a layer ID 3 denotes a layer in which the DB server is located. A log information ID is an identifier that is given to uniquely identify each log. A server name is an identifier used to uniquely identify a server 208 where log information 209 exists. The server name uses a name of the server 208 on a network.

A log file name represents a name of a file in which log information 209 is recorded. A log format represents a format in which log information 209 is recorded. In this embodiment, Web represents a record format of the log information 108 shown in FIG. 2. In a similar manner, AP represents a record format of the log information 109, and DB represents a record format of the log information 110. A related session flag is a flag indicating whether or not related session information 401 is included in the log information 209. If a value is 1, it shows that the log information 209 includes the related session information 401.

On the basis of information about the log-configuration definition table 204, the log information collection unit 201 collects, from log information 209 corresponding to a specified log information ID, only log entries 301 that match conditions such as range specifications of the log recorded time information 303, and specifications of the session information 302.

Next, on the basis of definition information defined in the log-configuration definition table 204, the session-information extraction unit 202 creates the session-information management table 205 and the session-information association table 206 (step 1702). Details of this operation will be described with reference to a flowchart shown in FIG. 6. The session-information extraction unit 202 selects a piece of definition information about the log information 209 defined in the log-configuration definition table 204, and then collects the log information 209 included in the server 208 through the log information collection unit 201 (step 901).

One log entry 301 is extracted from the collected log information 209 (step 902) to judge whether or not session information 302 is included in the extracted log entry 301 (step 903). If the session information 302 is included, the session information 302, and a log information ID of the log information 209 that is now being scanned, are added to the session-information management table 205 shown in FIG. 5 (step 904).

If the related session flag of the log information 209 that is now being scanned is 1, a judgment is made as to whether or not the log entry 301 includes related session information 401 (step 905). If the related session information 401 is included, the session information 302, a log information ID of the log information 209 that is now being scanned, and the related session information 401, are added to the session-information association table 206 shown in FIG. 7 (step 906).

If an unprocessed log entry 301 exists in the log information 209, the processing after step 902 is repeated (step 907). After the processing of a piece of log information 209 ends, if all of the log information 209 defined in the log-configuration definition table 204 is not processed yet, the processing after step 901 is repeated (step 908). As a result of the processing described above, it is possible to collect information about the session information 302 and the related session information 401 that are included in all of the log information 209.

After the processing of step 1702 ends, the user specifies a log information ID and session information 302 using the target log entry input unit 210 (step 1703).

FIG. 14 illustrates an example of an input screen in the target log entry input unit 210. In the server-name selection box 1801, all server names defined in the log-configuration definition table 204 are displayed, which enables selection of one server name from among the displayed server names.

As a result of the selection from the server-name selection box 1801, log file names held by the server 208 corresponding to the selected server name is retrieved from a log definition table 204, and thereby all retrieved log file names are displayed in a log file name selection box 1802. After the log file name is selected in the log file name selection box 1802, the date and time of log information to be displayed is inputted into a date and time input box 1803, and then pressing log display information button 1804 is depressed. This causes log information 209 that matches the conditions to be displayed in a log information display area 1805.

The user can specify a log information ID and session information 302 by selecting one log entry 301 in this log information display area 1805. In addition, instead of using the log information display area 1805, directly inputting a value of the session information 302 into the session information input box 1806 also enables specification of a log information ID and session information 302 in like manner.

Figure 8:
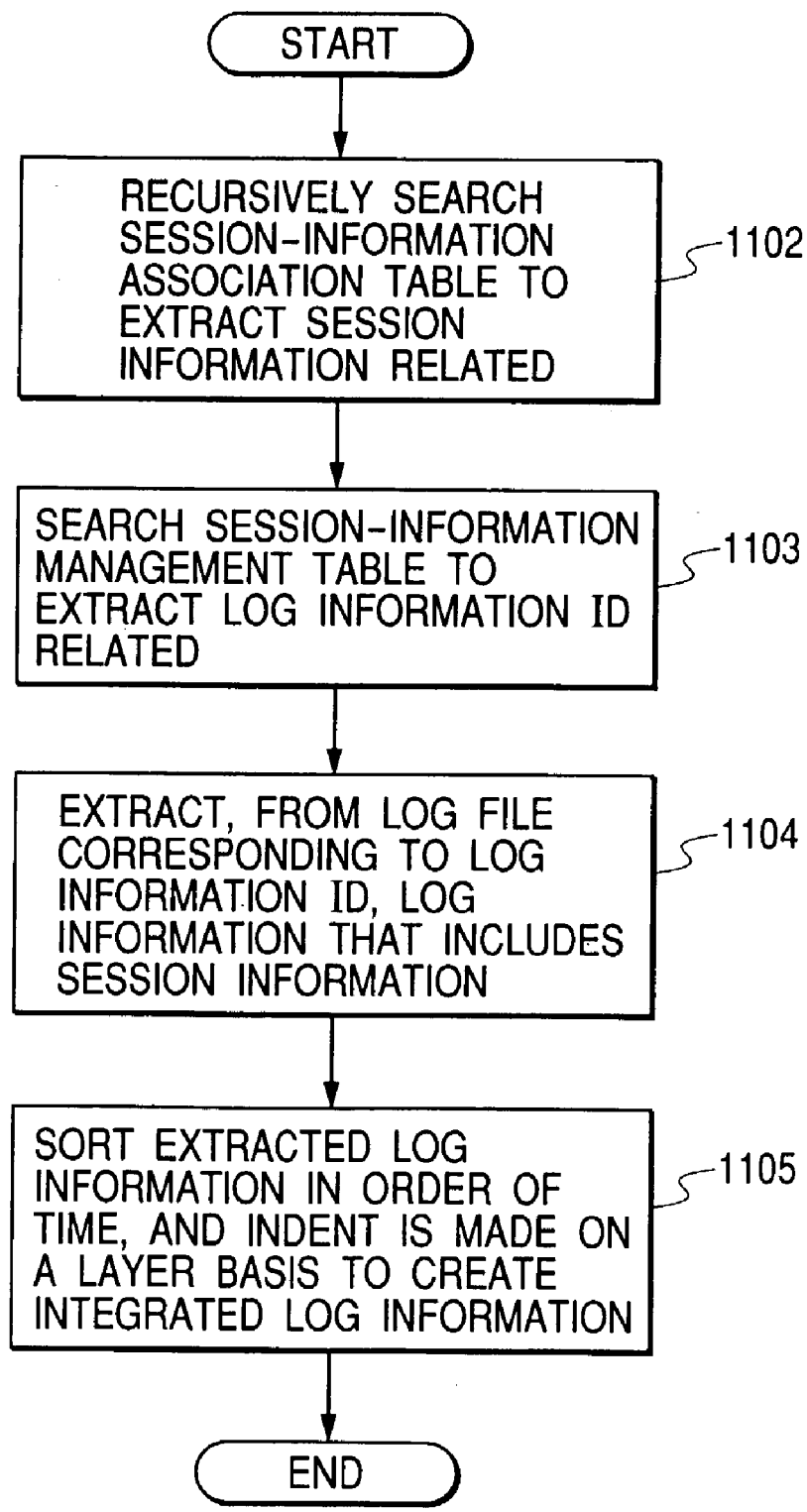
FIG. 8 is a flowchart illustrating a process flow in which integrated log information is created in the first embodiment.

Next, depressing an integrated log display button 1807 creates integrated log information 207 relating to the specified session information 302 (step 1704). Details of the processing in the step 1704 will be described with reference to a flowchart in FIG. 8 below.

Related session information 401 is obtained by searching the session-information association table 206 using the specified log information ID and the session information 302 as search conditions. Moreover, further related session information 401 is obtained by searching the session-information association table 206 using this related session information 401 as a new search condition. If this search is done recursively, the user can obtain a set of related session information 401 relating to the session information 301 specified by the target log entry input unit 210 (step 1102).

From the session-information management table 205, a log information ID is obtained for each piece of the related session information 401 that has been obtained in step 1102 (step 1103). Then, the log information ID obtained in step 1103 and the related session information 401 are specified as collection conditions in the log information collection unit 201 to obtain log information (step 1104). In the description below, log information that matches this collection condition is designated as partial log information so as to distinguish this log information from unprocessed log information 209 in the server 208.

The plurality of partial log information collected in the step 1104 are integrated by the log information integrating unit 203 in order of log recorded time information 303 in the log entry, and thereby Integrated log information 207 is created (step 1105). The Integrated log information 207 created is output to an integrated log display text area 1808 (step 1705).

An example of the integrated log information 207 is illustrated in the lower right of FIG. 2. The example of the Integrated log information 207 in FIG. 2 is Integrated log information 207 obtained when specifying Session 1 as session information 302 in the target log entry input unit 210 in relation to log information (108, 109, 110) shown in FIG. 2. Judging from FIG. 7, the related session information 401 relating to Session 1 as session information 302 is constituted of three pieces of session information, that is, Cookie 1, TranID 1, and TranID 2. Accordingly, log information corresponding to the session information is collected from each piece of the log information (108, 109, 110), and the collected log information is integrated as a piece of log information, which is Integrated log information 207 shown in FIG. 2.

In this embodiment, when integrating partial log information, an indent is made by inserting blank characters, the number of which corresponds to a size of a layer ID, after the log recorded time information 303 according to a layer ID defined in the log-configuration definition table so that the user can easily identify a layer, log information 209 of which includes the log entry 301. As a result, integrated log information 207 is created. In other words, as shown in the integrated log information 207 in FIG. 2, as compared with the log entry 301 of the Web server 105 (layer ID 2), a part after the log recorded time information 303 for the log entry 301 of the AP server 106 (layer ID 1) is shifted to the right side.

In this embodiment, log information is integrated by use of the above-mentioned indent. However, this embodiment can also be applied to other methods. For example, this method can also be applied to a method in which a color in the integrated log information 207 is changed according to the difference in layer ID.

As described above, using the system to which the integrated log displaying method described in this embodiment is applied thus enables combination of log information 209, which is individually held by each of the plurality of servers 208, into the Integrated log information 207, and also makes it possible to selectively provides the user with only information relating to the processing to which the user pays attention.

In the embodiment described above, the session-information management table 205 and the session-information association table 206 are created before the user operates the target log entry input unit 210 to create integrated log to be displayed. However, this embodiment can also be applied to a method in which the session-information management table 205 and the session-information association table 206 are created according to the flowchart in FIG. 6 after the user operates the target log entry input unit 210.

Second Embodiment

In the first embodiment, in the processing of step 1702, the session-information management table 205 and the session-information association table 206 are created from the log information 209 that is already recorded. In the second embodiment, the following processing is added in place of the processing of step 1702: log information 209 is additionally recorded on the side of the server 208 concurrently with the creation of creating the session-information management table 205 and the session-information association table 206.

Figure 9:
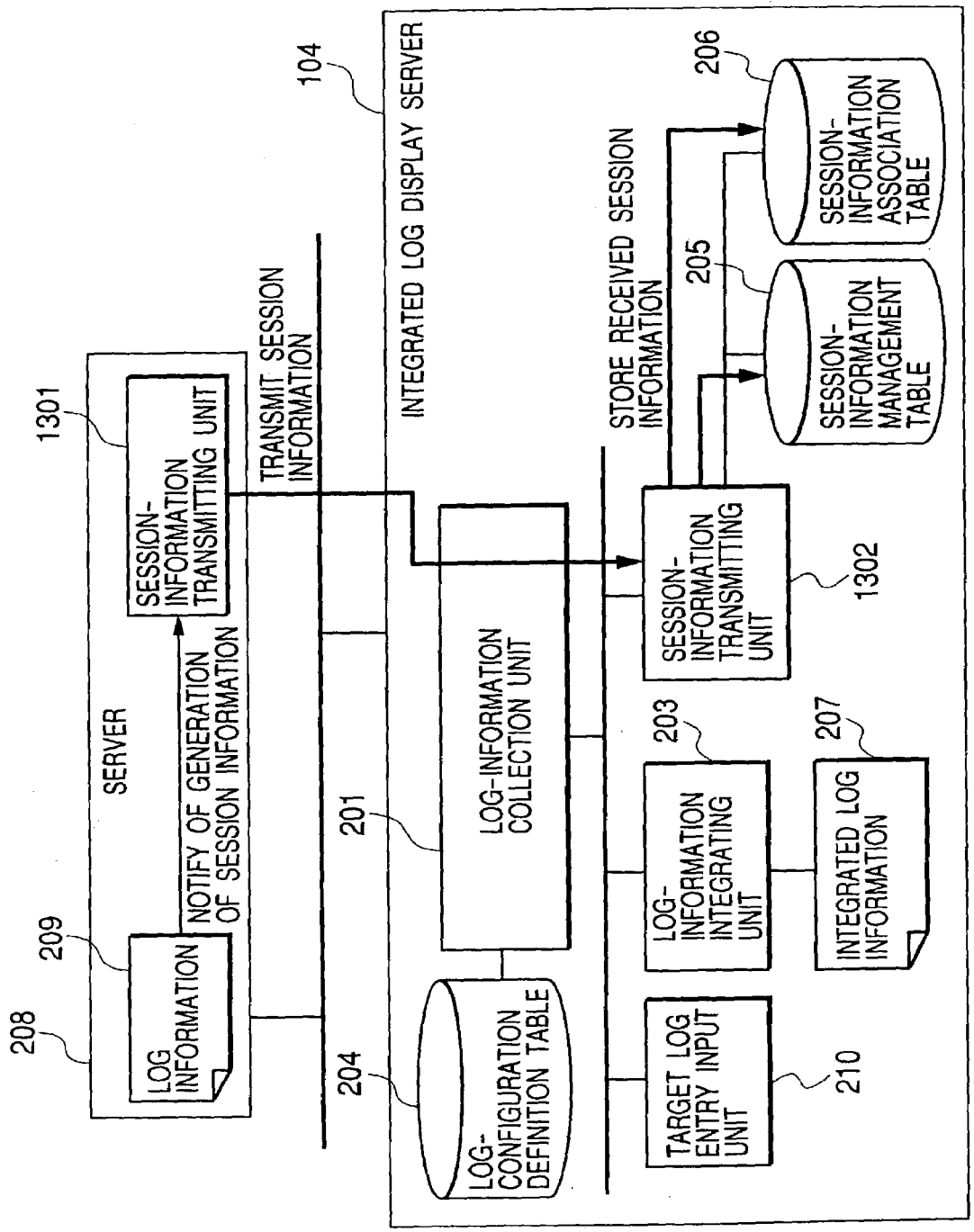
FIG. 9 is a block diagram illustrating components in an integrated log display server according to a second embodiment.

FIG. 9 illustrates a configuration of this embodiment. When recording a new log entry 301 in log information 209, the server 208 transmits session information 302 and a log information ID, which are included in the log entry 301, from a session-information transmitting unit 1301 to a session-information receiving unit 1302 in the integrated log display server 104. In addition, if related session information 401 is also included in the log entry, also the related session information 401 is transmitted.

The session information receiving unit 1302 adds the session information 302 and the log information ID, which have been received, to session-information management table 205. In addition, if the related session information 401 is simultaneously received, three kinds of information, i.e., the session information 302, the log information ID, and the related session information 401 are added to the session-information association table 206. As a result of the processing described above, it is possible to create the session-information management table 205 and the session-information association table 206 that are the same as those of the first embodiment.

The configuration and the processing are the same as those of the first embodiment except the above-mentioned processing of this embodiment. Even if the related session information 401 is not recorded in log information 209 individually held by each of the plurality of servers 208, using the system, to which the Integrated log displaying method described in this embodiment is applied, enables combination of the log information 209 into the Integrated log information 207, and also makes it possible to selectively provides the user with only information relating to the processing to which the user pays attention.

Third Embodiment

Figure 10:
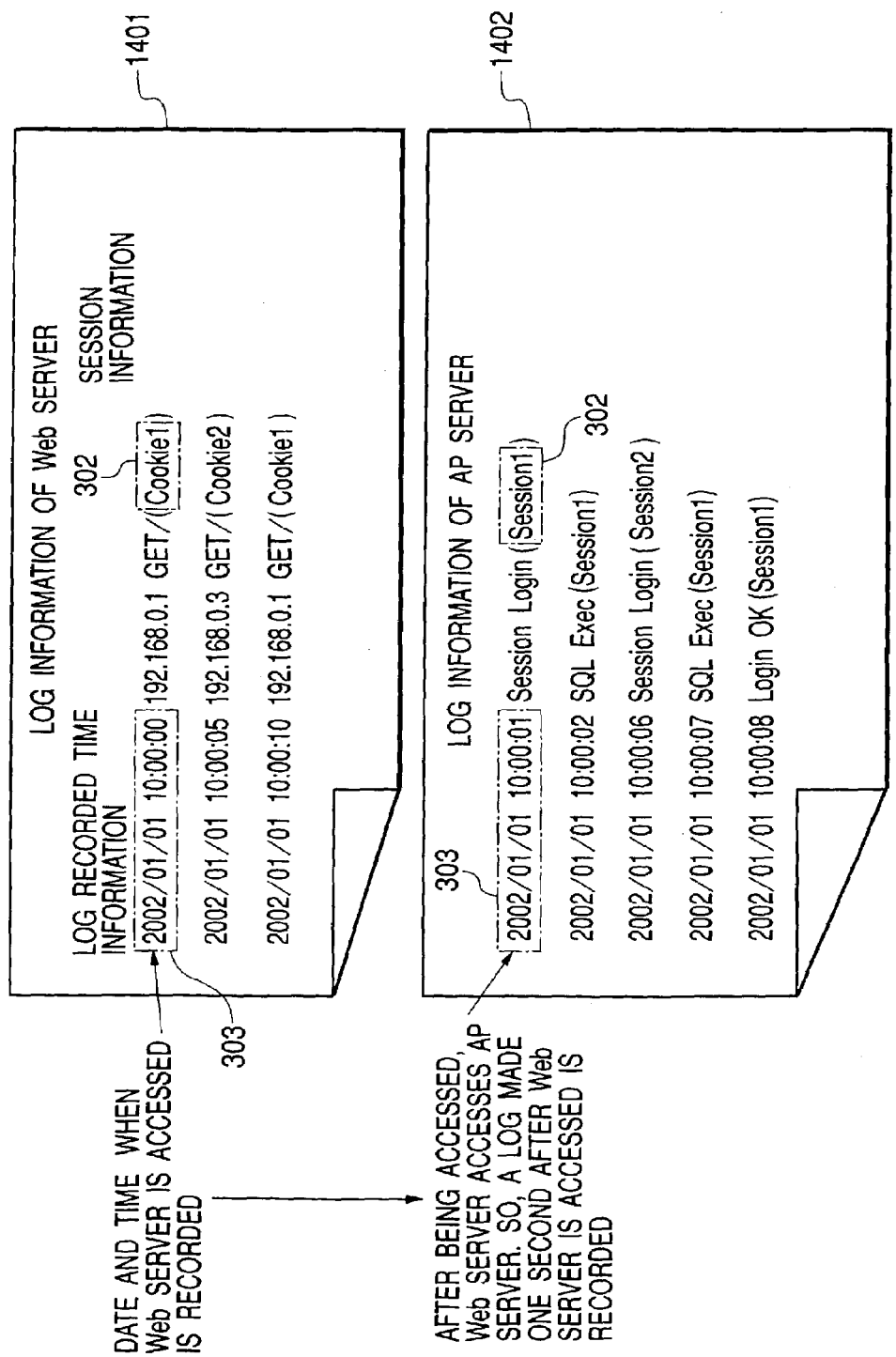
FIG. 10 is a diagram illustrating an example of log information according to a third embodiment.

A third embodiment is an embodiment in which if the related session information 401 is not included in the first embodiment, the relation of the session information is estimated from the order of the recording date and time of log information. FIG. 10 illustrates an example of the log information in this embodiment. As is clearly understood from the comparison between the log information 1402 of the AP server 106 in FIG. 10 and the log information 109 of the AP server 106 in FIG. 2, the related session information 401 is not recorded in the log information 1402 of the AP server 106. In this embodiment, processing shown in a flowchart of FIG. 12 is performed as the processing of step 1702 in the first embodiment instead of the processing of the flowchart of FIG. 6.

Figure 6:
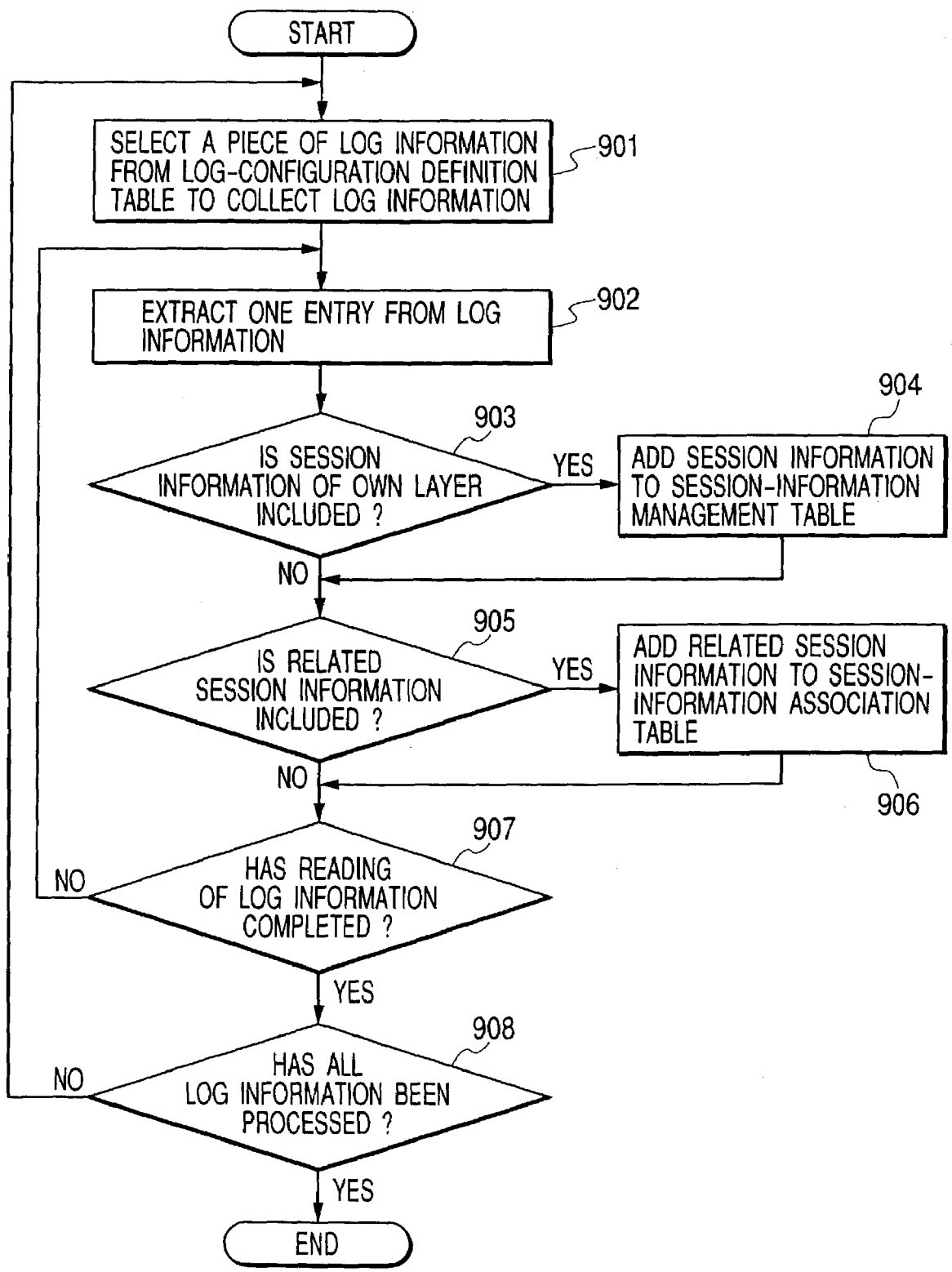
FIG. 6 is a flowchart illustrating a process flow in which a table relating to session information is created in the first embodiment.

Part of the processing of the flowchart in FIG. 12, which is different from the processing of the flowchart in FIG. 6, will be described below. After the processing which adds the session information 302 to the session-information management table 205 (step 904), four kinds of information, i.e., information about the recorded date and time of session 303, log information ID, layer ID, and session information 302, is recorded in a session-information recorded date and time table 1501 shown in FIG. 11 (step 1601).

Figure 12:
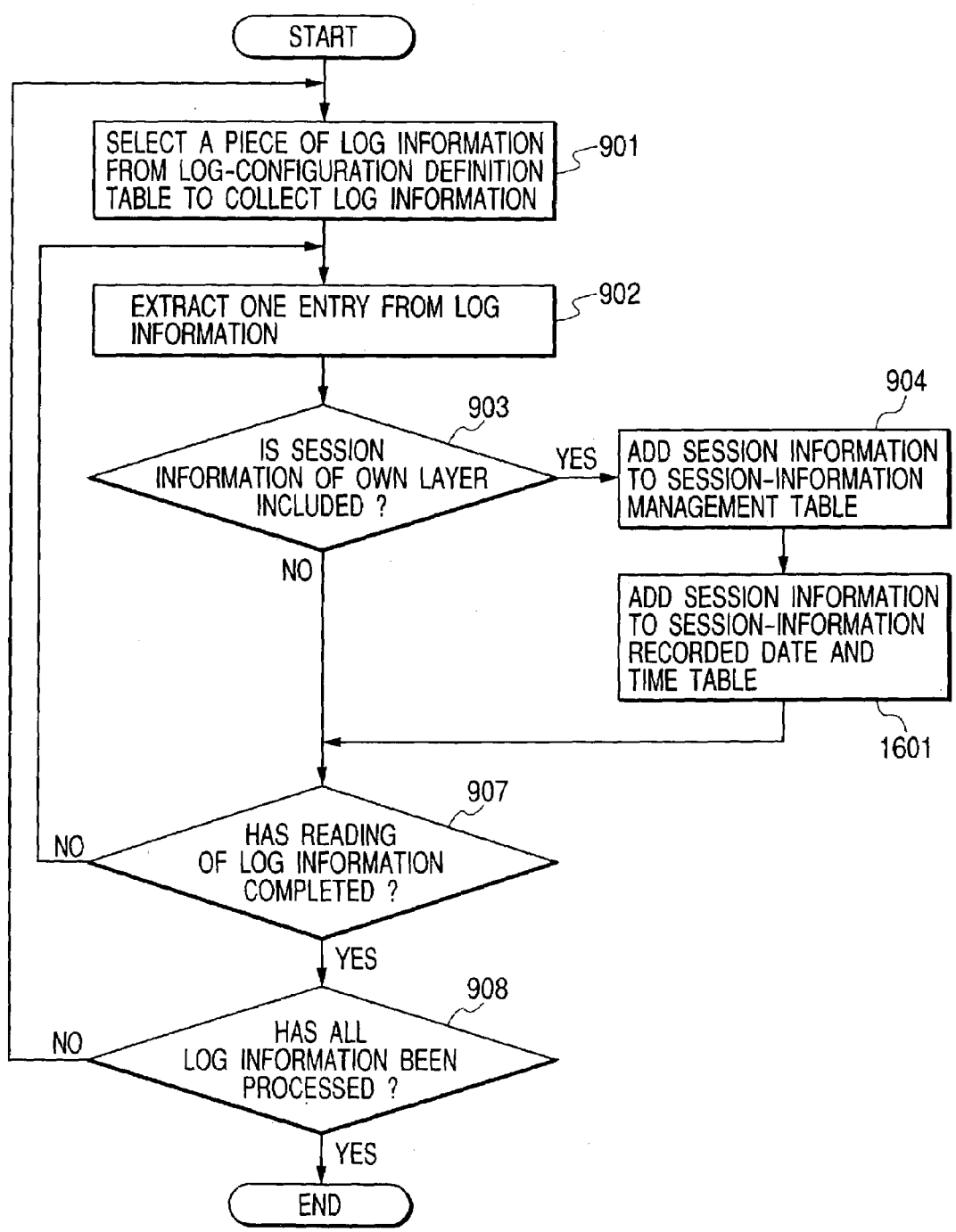
FIG. 12 is a flowchart illustrating a process flow in which a table relating to session information is created in the third embodiment.

FIG. 11 illustrates an example of the session-information recorded date and time table 1501 after the processing of the flowchart in FIG. 12 ends. Two pieces of information in adjacent rows of this session-information recorded date and time table 1501 are compared with each other. If the information of the lower row has a layer deeper than that of the upper row by one level (to be more specific, if a layer ID of the lower row is larger than that of the upper row by one), it is judged that both of session information 302 are related to each other, and therefore the session-information association table 206 is created. For example, in FIG. 11, since a layer ID of a row 1502 differs from that of a row 1503 by only one, it is possible to judge that Cookie 1 as session information 302 of the row 1502 and Session 1 as session information 302 of the row 1503 are related to each other.

The processing described above permits the session-information association table 206 to be created. Additionally, in this embodiment, the relation between both pieces of the session information 302 is estimated using the adjacent relation in the session-information recorded date and time table 1501. However, even if a method for estimating the relation between both pieces of the session information 302 from a statistical tendency of the adjacent relation in the session-information recorded date and time table 1501 is applied so as to increase accuracy, this embodiment can also be applied.

The configuration and the processing are the same as those of the first embodiment except the above-mentioned processing of this embodiment. Even if the related session information 401 is not recorded in log information 209 individually held by each of the plurality of servers 208, using the system, to which the Integrated log displaying method described in this embodiment is applied, enables combination of the log information 209 into the Integrated log information 207, and also makes it possible to selectively provides the user with only information that is estimated to be related to the processing to which the user pays attention.

It is also possible to store a program for executing the method of the present invention described above in a storage medium that can be read by a computer, and then to load this program into a memory to execute it.

As described above, according to the present invention, in a complicated system, such as a web system, comprising two or more kinds of servers and a plurality of servers, each of which has different functions, specifying, from among a plurality of log information held by the server groups, part of log information relating to processing to which a user pays attention permits only log information relating to the specified processing to be collected, and also permits the collected log information to be integrated before providing a user with the log information.

What is claimed is:

1. An integrated log displaying method used in an integration server that is connected via a network to a plurality of processing servers which perform a set of processing while mutually transmitting and receiving information, the integration server holding log information as an operation history relating to the set of processing, the method comprising:
    collecting log information via the network from the server in which holds log information as a history of processing;
    extracting session information and session related information from the log information;
    storing the session information extracted in a session-information management table;
    storing association between the session information extracted in a session-information association table; and
    integrating the log information relating to specified session information obtained by referring to the session-information management table and the session-information association table.

2. The method according to claim 1, further comprising:
    specifying a log information ID and session information to search the session-information management table and the session-information association table; and
    displaying the log information integrated on a display screen.

3. The method according to claim 1, comprising:
    storing definition information about all log information in a log-configuration definition table; and
    selecting a piece of definition information about the log information defined in the log-configuration definition table; and
    collecting selectively the log information included in the server according to the definition information.

4. The method according to claim 3, wherein the log-configuration definition table stores a layer ID representing a layer in which a server is located, a log information ID being an identifier given to uniquely identify each log information, a server name being an identifier used to uniquely identify a server where log information exists, a log file name representing a name of a file in which log information is recorded, a log format represents a format in which log information is recorded and a related session flag being a flag indicating whether or not related session information is included in the log information.

5. The method according to claim 1, wherein the session-information management table stores a log information ID indicating the log information and session information therein.

6. The integrated log displaying system according to claim 1, wherein the session-information association table stores a log information ID indicating the log information, session information and related session information relating to the session information therein.

7. An integrated log displaying system comprising:
a log information collection unit that selectively collects log information via a network from a server in which holds log information as a history of processing;
a session-information extraction unit that extracts session information and session related information from the log information collected by the log information collection unit;
a session-information management table that stores the session information extracted by the session-information extraction unit;
a session-information association table that stores association between the session information extracted by the session-information extraction unit; and
a log information integrating unit that integrates the log information collected through the log information collection unit relating to specified session information obtained by referring to the session-information management table and the session-information association table.

8. The integrated log displaying system according to claim 7, wherein the integrated log displaying system is constructed by an integration server being connected via the network to servers that perform a set of processing while mutually transmitting and receiving information and holding log information as a history of processing in its own server.

9. The integrated log displaying system according to claim 7, further comprising:
a means for specifying a log information ID and session information to search the session-information management table and the session-information association table; and
a means for displaying the log information integrated by the log information integrating unit.

10. The integrated log displaying system according to claim 7, further comprising:
a log-configuration definition table that stores definition information about all log information,
wherein the session-information extraction unit selects a piece of definition information about the log information defined in the log-configuration definition table, and then collects the log information included in a server through the log information collection unit.

11. The integrated log displaying system according to claim 10, wherein the log-configuration definition table stores a layer ID representing a layer in which a server is located, a log information ID being an identifier given to uniquely identify each log information, a server name being an identifier used to uniquely identify a server where log information exists, a log file name representing a name of a file in which log information is recorded, a log format representing a format in which log information is recorded, and a related session flag indicating whether or not related session information is included in the log information.

12. The integrated log displaying system according to claim 7, wherein the session-information management table stores a log information ID indicating the log information and session information therein.

13. The integrated log displaying system according to claim 7, wherein the session-information association table stores a log information ID indicating the log information, session information and related session information relating to the session information therein.

14. The integrated log displaying system according to claim 13, wherein the session-information association table stores cookie and transfer information as the session information therein.

15. The integrated log displaying system according to claim 7, wherein a plurality of partial log information collected are integrated by the log information integrating unit in order of log recorded time information in a log entry.

16. A computer-readable storage medium for storing a program for executing an integrated log displaying method used in an integration server connected via a network to a plurality of processing servers, comprising:
code for collecting log information via the network from the server in which holds log information as a history of processing;
code for extracting session information and session related information from the log information;
code for storing the session information extracted in a session-information management table;
code for storing association between the session information extracted in a session-information association table; and
code for integrating the log information relating to specified session information obtained by referring to the session-information management table and the session-information association table.

17. The computer-readable storage medium according to claim 16, further comprising:
code for specifying a log information ID and session information to search the session-information management table and the session-information association table; and
code for displaying the log information integrated on a display screen.

18. The computer-readable storage medium according to claim 16, comprising:
code for storing definition information about all log information in a log-configuration definition table;
code for selecting a piece of definition information about the log information defined in the log-configuration definition table; and
code for collecting selectively the log information included in the server according to the definition information.

19. The computer-readable storage medium according to claim 16, wherein the session-information management table stores a log information ID indicating the log information and session information therein.

20. The computer-readable storage medium according to claim 16, wherein the session-information association table stores a log information ID indicating the log information, session information and related session information relating to the session information therein.

* * * * *